Feb. 11, 1964  H. E. BRAUNING  3,120,836
ANIMAL TABLE
Filed Sept. 27, 1961
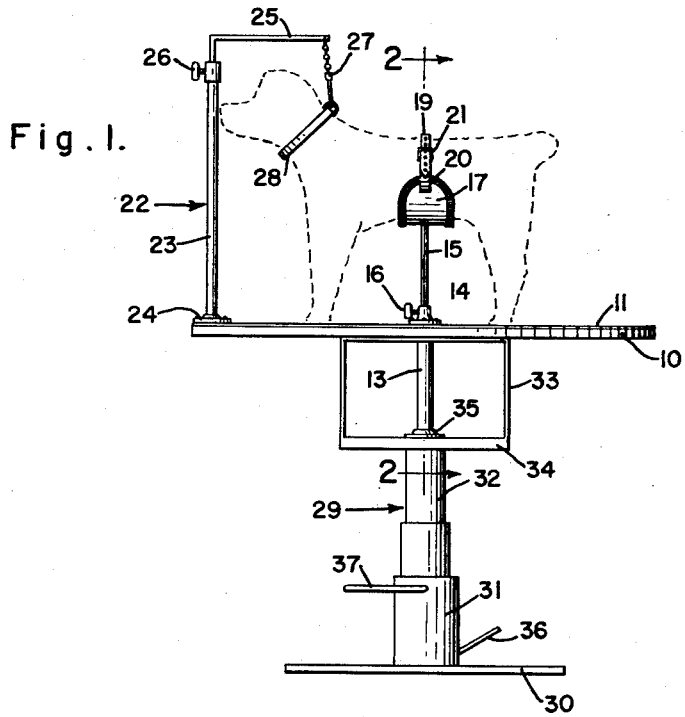
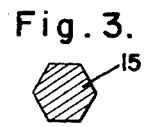
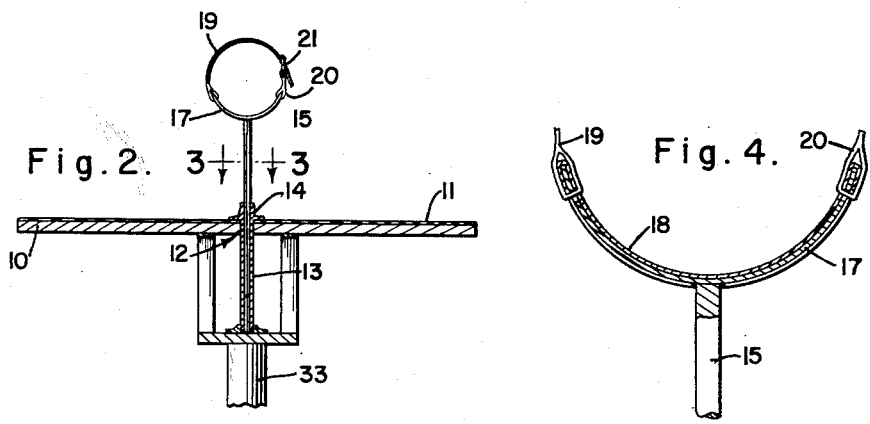
INVENTOR.
Howard E. Brauning
BY

United States Patent Office 3,120,836
Patented Feb. 11, 1964

3,120,836
ANIMAL TABLE
Howard E. Brauning, 2007 Harrison Ave., Eureka, Calif.
Filed Sept. 27, 1961, Ser. No. 141,050
2 Claims. (Cl. 119—103)

This invention relates to a device for use with animals, and especially with dogs. More particularly, it relates to a table upon which dogs may be held in the proper position for various treatments such as for grooming or medical care.

In the preferred embodiment, the gist of the invention is to provide a saddle which is adjustable in height above a table. The appropriate part of the underside of a dog or other animal is placed in the saddle and strapped to the saddle. The saddle is raisable above the table so that the animal's feet, or at least the rear feet, are held out of contact with the table surface. Such a position immobilizes the dog or other animal in the desired position and permits the contemplated treatment.

Thus the invention may be regarded broadly as a device for facilitating the treatment of dogs comprising a base member and means adjacent to the top of the base member and projecting upwardly therefrom for engaging the body of a dog. The engaging means is operable to substantially prevent lateral movement of the dog with respect to the base without obstructing access to a major portion of the dog.

Reference is made to the accompanying drawings in which:

FIG. 1 shows in side elevation the device provided by the present invention with a dog (in dotted lines) suitably positioned on the device.

FIG. 2 shows in end section a portion of the device of FIG. 1 taken along the line 2—2 including the saddle and closely associated parts.

FIG. 3 in top section shows the rod supporting the saddle of FIG. 2 taken along the line 3—3.

FIG. 4 shows in enlarged end section the saddle and part of the rod of FIG. 2.

Previously, animal treatment or grooming tables have included little more than a table with a neck restraining collar for the animal. In this type of device many dogs have hung or injured themselves by jumping off the table while secured by the neck. Moreover, prior devices, in restraining the animal by the neck, gave it the feeling of being choked and caused it to fight and pull thereby further increasing the choking effect of the device. All of these factors induced fear and restlessness in the animal and hampered the proposed treatment or grooming.

Prior devices have other disadvantages, particularly when using clippers to remove some of the fur from certain breeds of dogs. In the case of fur removal, the face and neck must be clipped. The collar or chain placed on the animal's neck as required by prior devices was very much of a hinderance.

The present device overcomes all of the foregoing disadvantages and offers numerous other advantages in addition. Thus the saddle provided by the present invention gives the dog or other animal a feeling of comfort as it rests on the saddle so that it behaves in much the same manner as if the dog's stomach was rubbed. The saddle prevents the dog from sitting or lying down as in prior devices. When properly positioned in the saddle the dog must remain on all four feet. But even if left unattended it is restrained by the saddle from laterally shifting its position or jumping off the table. As a result considerable time is saved by not having to continuously return the animal to an accessible position.

Another important advantage of the present device is that the animal will remain in better physical and mental condition during the grooming or treatment. The animal may rest on the saddle during the procedure instead of being required to stand on its feet for long periods. (As long as four hours or more for pre-show grooming.) This long, tiring procedure in the past has resulted in animals going into show rings and the like having cross and tired dispositions.

The present saddle table also makes it possible to groom any dog regardless of temperament since it can optionally be used in conjunction with a neck restraint making it impossible for the dog to bite the groomer while working on the dog.

In veterinary work the saddle table will be beneficial in that it will enable the veternarian to administer shots or perform minor surgery and the like without the aid of an assistant.

The saddle may even be used to secure a dog by its neck while cleaning its teeth. Teeth cleaning of dogs is a tedious job, and in the absence of the present invention, the dog must often be given an anesthetic because of the inability to control the dog by the sole means of a chain around its neck.

Turning to the drawing, there is shown a table top 10 which may suitably be circular in shape. The table top 10 is covered by a rubber mat 11 bonded thereto.

Located generally centrally through the table top 10 and its covering 11 is axial aperture 12. A tubular member or hollow pipe 13 is inserted in aperture 12, and is fixed to table top 10 with a collar 14 so that the major portion of tube 13 extends below table 10. Rod 15 is inserted interiorly of pipe 13 and is adapted to slidably telescope in and out of pipe 13. Rod 15 is releasably locked in a selected position with respect to pipe 13 by means of set screw 16 in collar 14.

Rod 15 is of a sufficient length so that it extends above table top 10. Preferably rod 15 is hexagonal in configuration as shown in FIG. 3.

At the upper end of rod 15, a concave saddle 17 is attached. Saddle 17 is suitably made from metal or other rigid material and is advantageously covered with a leather covering 18 extending over the edges of saddle 17. The saddle illustrated, except for the rounded corners, resembles one-half of a cylinder that has been cut longitudinally. Many other configurations could of course be employed. In addition, it is desirable to have a plurality of saddles of different sizes for treating animals of differing stature.

A pair of straps 19 and 20 are suitably joined to opposite sides of saddle 17. As a result, when a dog, as illustrated in FIG. 1, is properly placed in saddle 17, straps 19 and 20 may be positioned around the back of the animal and joined with a buckle 21 to secure the animal to the saddle 17 and substantially prevent lateral movement of the animal with respect to table top 10.

To assure complete immobilization of the animal, rod 15 may be telescoped outwardly from pipe 13 a sufficient distance so that the legs of the animal do not contact table top 10. The saddle will comfortably support the animal while preventing the animal from gaining any traction with its feet on the table top 10 and thereby assure the absence of unwanted lateral motion.

For certain types of treatment it may be beneficial to restrict movement of the animal to an even greater extent. In such event a neck restraining means shown generally at 22 in FIG. 1 may be employed in cooperation with the saddle 17. Neck restraining means 22 comprises a vertical pipe 23 secured to table top 10 by means of flanged collar 24. One end of L-shaped rod 25 is slidably telescoped into vertical pipe 23 and releasably locked at the desired height above table top 10 by means of lock screw 26.

The other end of L-shaped rod 25 has a flexible line 27 depending therefrom. Collar 28 is attached to the terminal end of line 27 for positioning around the neck of a dog as shown in FIG. 1. When a dog is saddled and collared as shown in FIG. 1, grooming or medical treatment of any type may be executed with complete ease and freedom on the parts of both the operator and the animal.

The entire foregoing table top 10, saddle 17, and neck restraining means 22 are supported with respect to the ground by a hydraulic lift shown generally at 29 in FIG. 1. Hydraulic lift 29 is similar to hydraulic lifts commonly used for raising automobiles for service in that it is hydraulically actuated and is movable vertically as well as being rotatable.

Hydraulic lift 29 comprises a base plate 30 with stepped cylinder 31 and piston 32 supported vertically thereabove. Frame 33 is fixed to the upper end of piston 32. Table top 10 rests upon and is fixed to the top of frame 33. The lower portion of pipe 13 rests upon horizontal frame member 34 and is attached thereto by bolts (not shown) through flanged collar 35.

When actuated by fluid, piston 32 moves upwardly or downwardly within cylinder 31 and is controlled by valve lever 36. Table top 10 is, of course, moved upwardly and downwardly along with piston 32. Consequently the height of table top 10 may be selected by suitable positioning of piston 32 in cylinder 31.

Piston 32 and cylinder 31 are suitably constructed similarly to hydraulic automobile lifts so that piston 32 may be axially rotated with respect to cylinder 31. This enables table top 10 to be rotated to any desired position.

When piston 32 has been rotated to the desired position, it may be locked in place by suitable locking means such as a curved brake shoe making contact with piston 32 or by means of a notch in piston 32 that is engageable with a locking key. The locking means employed may be operated by a conveniently positioned lever such as lever 37.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A device for facilitating the treatment of dogs comprising a generally horizontal base member comprised of only a single horizontal saddle comprising a generally arcuate concave surface for engaging the abdomen of a dog, said concave surface being sufficiently elongated longitudinally of the length of the dog so as to engage a substantial portion of the abdomen of a dog and be operable as a sole support thereof, strap means cooperating with said concave surface to releasably secure the dog thereto including an overhead neck restraining means having a vertical support, an L-shaped rod received therein and a flexible line depending therefrom attached to a collar for cooperation with said saddle in immobilizing a dog being treated, and means to vertically adjustably support said saddle over said base member.

2. A device in accordance with claim 1 wherein said strap means cooperating with said concave surface includes straps mounted on said saddle.

References Cited in the file of this patent
UNITED STATES PATENTS

| | | |
|---|---|---|
| 1,109,772 | Leyh | Sept. 8, 1914 |
| 1,401,393 | Cross | Dec. 27, 1921 |
| 2,035,321 | Koenigkramer et al. | Mar. 24, 1936 |
| 2,773,477 | Michael | Dec. 11, 1956 |
| 2,828,172 | McDonald | Mar. 25, 1958 |
| 2,829,622 | Borthwick | Apr. 8, 1958 |
| 3,023,734 | Schaub | Mar. 6, 1962 |